United States Patent Office
3,649,641
Patented Mar. 14, 1972

3,649,641
4-HYDROXY - 1 - SUBSTITUTED-1H-THIENO[2,3-c]
PYRAZOLE-5-CARBOXYLIC ACID DERIVATIVES
AND INTERMEDIATES THERETO
Dong H. Kim, Wayne, and Arthur A. Santilli, Havertown,
Pa., assignors to American Home Products Corporation, New York, N.Y.
No Drawing. Filed Nov. 4, 1969, Ser. No. 874,055
Int. Cl. C07d 49/18
U.S. Cl. 260—310 R                        4 Claims

ABSTRACT OF THE DISCLOSURE

4 - hydroxy-1-substituted-1H-thieno[2,3-c]-pyrazole-5-carboxylic acid derivatives useful as antiamebic agents are disclosed, as well as methods of synthesis of these compounds.

---

This invention concerns new and novel 4-hydroxy-1-substituted - 1H-thieno[2,3-c]pyrazole-4-carboxylic acid derivatives. In addition, it also relates to the intermediates and methods used in the synthesis of the aforementioned new and novel compounds.

The compounds of the present invention are of the formula:

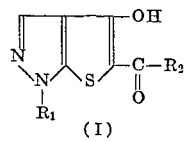

wherein $R_1$ is selected from the group consisting of phenyl, p-halophenyl, loyer alkylphenyl and lower alkoxyphenyl; and $R_2$ is selected from the group consisting of anilino, naphthylamino and lower alkoxy. The terms "lower alkyl," "lower alkoxy" and the like as employed herein refer to both branched and straight chain groups containing from one to about six carbon atoms. The expression "halo" as used herein refers to halogen, i.e. chlorine, bromine, fluorine and iodine.

SYNTHESIS

The compounds of the present invention (I) are produced by reacting a 5-chloro-1-substituted-4-pyrazole-carboxylic acid, ester of the formula:

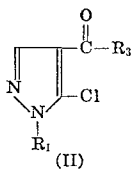

wherein $R_1$ is as set forth in Formula I and $R_3$ is lower alkoxy, with a substituted mercaptoacetate of the formula:

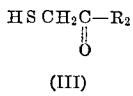

wherein $R_2$ is as set forth in Formula I, by heating at about the reflux temperature for a period ranging from about two up to about five hours in a reaction inert organic solvent, such as a di(lower)alkylformamide (e.g. dimethylformamide) in the presence of a base, such as an alkali metal carbonate or bicarbonate (e.g. sodium, potassium and lithium). The reaction product may be recovered by routine procedures, such as pouring into ice-water to form a precipitate which may then be recrystallized from an appropriate solvent, such as an alkanol (e.g. methanol). The resulting compounds are of the formula:

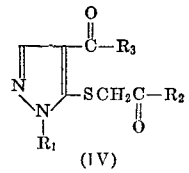

wherein $R_1$ and $R_2$ are as set forth in Formula I and $R_3$ is as set forth in Formula II. The expression "reaction inert organic solvent" as used herein refers to an organic solvent which does not enter into the reaction. The starting materials, Formula II, are known in the art and may be provided by methods described by C. C. Cheng et al., J. Org. Chem., 21, 1240 (1956).

The compounds of Formula IV may be reacted, without purifying if desired, by contacting with an alkali metal (lower)alkoxide (e.g. metallic sodium in ethanol) by heating at about the reflux temperature for a period ranging from about one hour up to about four hours. The resulting reaction product may be purified by using routine procedures, such as removing the solvent by evaporating under reduced pressure, dissolving the residue in water and acidifying the solution with an acid such as hydrochloric acid, to form a precipitate which is collected by filtration and recrystallized from an appropriate solvent, such as a di(lower)alkylformamide (e.g. dimethylformamide)-water mixture. The purified compounds are those of the present invention, Formula I.

The compounds of the present invention (I) are effective antiamebic agents when compared to the known standard, emetine hydrochloride, in a test similar to that described by Thompson et al., Antibio. & Chemo. 6 (1956) 337–50. In this test the substance being tested is incorporated and diluted in the aqueous phase of a modified Boeck-Drbohlav dibasic medium fortified with rice starch. The medium is inoculated with polybacteria and a known number of trophozoites of *E. Histolytica* NIH 200. After 48 hours incubation at 35° C., the trophozoites are counted. The results are expressed as Minimal Inhibitory Concentration (MIC) in mg./ml.: the least amount of test substance that completely inhibits *E. histolytica*. At a concentration of .488 mg./ml. emetine hydrochloride had 100 percent inhibition whereas 4-hydroxy-1-phenyl-1H-thieno[2,3-c]pyrazole-5-carboxanilide had a 26 percent kill at a concentration of 250 mg./ml.

The compounds of the present invention would be useful as antiamebic agents wherever placed in contact with the ameba to be destroyed. This would include the washing of objects such as laboratory and medical equipment, barns, stables, food storage areas and animals. The compounds of the present invention would be used in topical compositions such as washes, soap and soapless cleansers, topical aerosols, ointments and topical drops.

The following examples are illustrative of the present invention:

EXAMPLE I

A mixture of 5.0 g. of 5-chloro-1-phenyl-4-pyrazole-carboxylic acid, ethyl ester, 3.3 g. of 2-mercaptoacetanilide, 2.2 g. of sodium carbonate and 65 ml. of N,N-dimethylformamide are heated at reflux for three hours. The reaction solution is poured into water. After standing overnight an oil separates which is crystallized by redissolving in N,N-dimethylformamide and pouring over ice. The precipitate is filtered and recrystallized from methanol. The compound produced is 1-phenyl-5-[(phenylcarbamoyl)methylthio]-4-pyrazolecarboxylic acid, ethyl ester.

In a similar manner, using the appropriate starting materials, the following compounds are provided:

1-(p-bromophenyl)-5-[(phenylcarbamoyl)methylthio]-4-pyrazolecarboxylic acid, propyl ester;
1-(p-chlorophenyl)-5-[(phenylcarbamoyl)methylthio]-4-pyrazolecarboxylic acid, ethyl ester;
5-[(phenylcarbamoyl)methylthio]-1-(p-tolyl)-4-pyrazolecarboxylic acid, methyl ester;
1-(p-fluorophenyl)-5-[(phenylcarbamoyl)methylthio]-4-pyrazolecarboxylic acid, butyl ester;
5-[(phenylcarbamoyl)methylthio]-1-(p-propoxyphenyl)-4-pyrazolecarboxylic acid, methyl ester;
5-[(phenylcarbamoyl)methylthio]-1-(o-tolyl)-4-pyrazolecarboxylic acid, ethyl ester;
1-(p-methoxyphenyl)-5-[(phenylcarbamoyl)methylthio]-4-pyrazolecarboxylic acid, propyl ester;
1-(p-iodophenyl)-5-[(phenylcarbamoyl)methylthio]-4-pyrazolecarboxylic acid, ethyl ester;
1-(p-ethylphenyl)-5-[(phenylcarbamoyl)methylthio]-4-pyrazolecarboxylic acid, methyl ester.

EXAMPLE II

A mixture of 6.0 g. of 5-chloro-1-phenyl-4-pyrazolecarboxylic acid, ethyl ester, 4.0 g. of 2-mercapto-N-(2-naphthyl)acetamide, 3.0 g. of potassium carbonate and 100 ml. of dimethylformamide are heated at reflux for four hours. The reaction mixture is poured into ice-water to form a precipitate which is separated by filtration and recrystallized from ethanol. The compound recrystallized is 5-[([2-naphtyl]carbamoyl)methylthio] - 1 - phenyl - 4-pyrazolecarboxylic acid, ethyl ester.

In a similar manner, using the appropriate starting materials, the following compounds are provided:

1-(p-bromophenyl)-5-[([2-naphthyl]carbamoyl)methylthio]-4-pyrazolecarboxylic acid, propyl ester;
1-(p-chlorophenyl)-5-[([2-naphthyl]carbamoyl)methylthio]-4-pyrazolecarboxylic acid, ethyl ester;
5-[([2-naphthyl]carbamoyl)methylthio]-1-(p-tolyl)-4-pyrazolecarboxylic acid, methyl ester;
1-(p-fluorophenyl)-5-[([2-naphthyl]carbomyl)methylthio]-4-pyrazolecarboxylic acid, butyl ester;
5-[([2-naphthyl]carbamoyl)methylthio]-1-(p-propoxyphenyl)-4-pyrazolecarboxylic acid, methyl ester;
5-[([2-naphthyl]carbamoyl)methylthio]-1-(o-tolyl)-4-pyrazolecarboxylic acid, ethyl ester;
1-(p-methoxyphenyl)-5-[([1-naphthyl]carbamoyl)-methylthio]-4-pyrazolecarboxylic acid, propyl ester;
1-(p-iodophenyl)-5-[([2-naphthyl]carbamoyl)methylthio]-4-pyrazolecarboxylic acid, ethyl ester;
1-(p-ethylphenyl)-5-[([2-naphthyl]carbamoyl)methylthio]-4-pyrazolecarboxylic acid, methyl ester.

EXAMPLE III

A mixture of 4.5 g. of 5-chloro-1-phenyl-4-pyrazolecarboxylic acid, ethyl ester, 3.0 g. of ethylmercaptoacetate, 2.0 g. of sodium bicarbonate and 60 ml. of dimethylformamide are heated at reflux for two and one-half hours. The reaction mixture is cooled to room temperature and poured into ice-water. The precipitate which forms is collected by filtration and recrystallized from methanol to give the compound 5-carboxymethylthio-1-phenyl-4-pyrazolecarboxylic acid, 4,5-diethyl ester.

In a similar manner, using the appropriate starting materials, the following compounds are provided:

1-(p-bromophenyl)-5-carboxymethylthio-4-pyrazolecarboxylic acid, 4-propyl ester, 5-ethyl ester;
5-carboxymethylthio-1-(p-chlorophenyl)-4-pyrazolecarboxylic acid, 4-ethyl ester, 5-isopropyl ester;
5-carboxymethylthio-1-(p-tolyl)-4-pyrazolecarboxylic acid, 4-methyl ester, 5-butyl ester;
5-carboxymethylthio-1-(p-fluorophenyl)-4-pyrazolecarboxylic acid, 4-butyl ester, 5-methyl ester;
5-carboxymethylthio-1-(p-propoxyphenyl)-4-pyrazolecarboxylic acid, 4-methyl ester, 5-propyl ester;
5-carboxymethylthio-1-(o-tolyl)-4-pyrazolecarboxylic acid, 4-ethyl ester, 5-propyl ester;
5-carboxymethylthio-1-(p-methoxyphenyl)-4-pyrazolecarboxylic acid, 4-propyl ester, 5-methyl ester;
5-carboxymethylthio-1-(p-iodophenyl)-4-pyrazolecarboxylic acid, 4-ethyl ester, 5-propyl ester;
5-carboxymethylthio-1-(p-ethylphenyl)-4-pyrazolecarboxylic acid, 4-methyl ester, 5-ethyl ester.

EXAMPLE IV

The oil obtained in Example I, from 5.0 g. of 5-chloro-1-phenyl-4-pyrazolecarboxylic acid, ethyl ester, is refluxed in sodium ethoxide solution (0.4 g. sodium in 75 ml. ethanol) for two hours. After removing the ethanol under reduced pressure, the residue is dissolved in water and then acidified with 3 N hydrochloric acid to give a solid. The solid is recrystallized twice from dimethylformamide-water to give 1.3 g. of the product, 4-hydroxy-1-phenyl-1$H$-thieno[2,3-c]pyrazole-5-carboxanilide, M.P. 250–252° C. with decomposition.

*Analysis*.—Calcd for $C_{18}H_{13}N_3O_2S$ (percent): C, 64.47; H, 3.91; N, 12.53; S, 9.56. Found (percent): C, 64.48; H, 3.88; N, 12.60; S, 9.57.

In a similar manner, from the appropriate starting materials, the following compounds are produced:

1-(p-bromophenyl)-4-hydroxy-1$H$-thieno[2,3-c]-pyrazole-5-carboxanilide;
1-(p-chlorophenyl)-4-hydroxy-1$H$-thieno[2,3-c]-pyrazole-5-carboxanilide;
4-hydroxy-1-(p-tolyl)-1$H$-thieno[2,3-c]-pyrazole-5-carboxanilide;
1-(p-fluorophenyl)-4-hydroxy-1$H$-thieno[2,3-c]-pyrazole-5-carboxanilide;
4-hydroxy-1-(p-propoxyphenyl)-1$H$-thieno[2,3-c]-pyrazole-5-carboxanilide;
4-hydroxy-1-(o-tolyl)-1$H$-thieno[2,3-c] pyrazole-5-carboxanilide;
4-hydroxy-1-(p-methoxyphenyl)-1$H$-thieno[2,3-c]-pyrazole-5-carboxanilide;
4-hydroxy-1-(p-iodophenyl)-1$H$-thieno[2,3-c] pyrazole-5-carboxanilide;
1-(p-ethylphenyl)-4-hydroxy-1$H$-thieno[2,3-c]-pyrazole-5-carboxanilide.

EXAMPLE V

To 4.0 g. of 5-[([2-naphthyl]carbamoyl)methylthio]-1-phenyl-4-pyrazolecarboxylic acid, ethyl ester is added sodium ethoxide solution (0.8 g. sodium in 150 ml. of ethanol). The mixture is refluxed for three hours. After removing the ethanol under reduced pressure, the residue is dissolved in water and acidified with glacial acetic acid to give a solid. The solid is filtered and recrystaillized twice from dimethylformamide-water to produce the compound 4 - hydroxy-N-(2 - naphthyl)-1-phenyl-1$H$-thieno[2,3-c]-pyrazole-5-carboxamide.

In a similar manner, using the appropriate starting materials, the following compounds are provided:

1-(p-bromophenyl)-4-hydroxy-N-(2-naphthyl)-1$H$-thieno[2,3-c]pyrazole-5-carboxamide;
1-(p-chlorophenyl)-4-hydroxy-N-(2-naphthyl)-1$H$-thieno[2,3-c]pyrazole-5-carboxamide;
4-hydroxy-N-(2-naphthyl)-(p-tolyl)-1$H$-thieno[2,3-c]-pyrazole-5-carboxamide;
1-(p-fluorophenyl)-4-hydroxy-N-(2-naphthyl)-1$H$-thieno[2,3-c]pyrazole-5-carboxamide;
4-hydroxy-N-(2-naphthyl)-1-(p-propoxyphenyl)-1$H$-thieno[2,3-c]pyrazole-5-carboxamide;
4-hydroxy-N-(2-naphthyl)-1-(o-tolyl)-1$H$-thieno-[2,3-c]pyrazole-5-carboxamide;
4-hydroxy-1-(p-methoxyphenyl)-N-(1-naphthyl)-1$H$-thieno[2,3-c]pyrazole-5-carboxamide;

4-hydroxy-1-(p-iodophenyl)-N-(2-naphthyl)-1H-
thieno[2,3-c]pyrazole-5-carboxamide;

1-(p-ethylphenyl)-4-hydroxy-N-(2-naphthyl)-1H
thieno[2,3-c]pyrazole-5-carboxamide.

EXAMPLE VI

To 5.0 g. of 5-carboxymethylthio-1-phenyl-4-pyrazole-carboxylic acid, 4,5 diethyl ester, is added sodium ethoxide solution (0.8 g. of sodium in 150 ml. ethanol). The mixture is refluxed for three hours. After removing the ethanol under reduced pressure, the residue is dissolved in water and acidified with 3 N hydrochloric acid to give a solid. The solid is filtered and recrystallized from dimethylformamide to give the compound 4-hydroxy-1-phenyl-1H-thieno[2,3-c]pyrazole-5-carboxylic acid, ethyl ester.

In a similar manner, using the appropriate starting materials, the following compounds are provided:

1-(p-bromophenyl)-4-hydroxy-1H-thieno[2,3-c]-
pyrazole-5-carboxylic acid, ethyl ester;
1-(p-chlorophenyl)-4-hydroxy-1H-thieno[2,3-c]-
pyrazole-5-carboxylic acid, isopropyl ester;
4-hydroxyl-1-(p-tolyl)-1H-thieno[2,3-c]pyrazole-
5-carboxylic acid, butyl ester;
1-(p-fluorophenyl)-4-hydroxy-1H-thieno[2,3-c]-
pyrazole-5-carboxylic acid, methyl ester;
4-hydroxy-1-(p-propoxyphenyl)-1H-thieno[2,3-c]-
pyrazole-5-carboxylic acid, propyl ester;
4-hydroxy-1-(o-tolyl)-1H-thieno[2,3-c]pyrazole-
5-carboxylic acid, propyl ester;
4-hydroxy-1-(p-methoxyphenyl)-1H-thieno[2,3-c]-
pyrazole-5-carboxylic acid, methyl ester;
4-hydroxy-1-(p-iodophenyl)-1H-thieno[2,3-c]pyrazole-
5-carboxylic acid, propyl ester;
1-(p-ethylphenyl)-4-hydroxy-1H-thieno[2,3-c]
pyrazole-5-carboxylic acid, ethyl ester.

What is claimed is:

1. A compound having the formula:

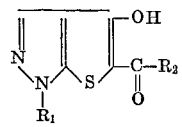

wherein $R_1$ is selected from the group consisting of phenyl p-halophenyl, lower alkylphenyl and lower alkoxyphenyl; and $R_2$ is selected from the group consisting of anilino, naphthylamino and lower alkoxy.

2. A compound as described in claim 1 which is: 4-hydroxy - 1 - phenyl - 1H - thieno[2,3-c]pyrazole-5-carboxanilide.

3. A compound having the formula

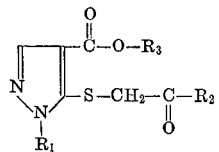

wherein $R_1$ is selected from the group consisting of phenyl, p-halophenyl, lower alkylphenyl and lower alkoxyphenyl; and $R_2$ is selected from the group consisting of anilino, naphthylamino and lower alkoxy; and $R_3$ is lower alkyl.

4. A compound as described in claim 3 which is: 1-phenyl - 5 - [(phenylcarbamoyl)methylthio]-4-pyrazolecarboxylic acid, ethyl ester.

References Cited

Kvitko et al.: Index Chemicus, vol. 35, issue 314, Abstract No. 122643 (1969).

Kvitko et al.: Chem. Abst., vol. 71, Abstract No. 112860c (1969).

Sandstrom: Chem. Abst., vol. 50, columns 12029–30 (1956).

NATALIE TROUSOF, Primary Examiner

U.S. Cl. X.R.

424—273